Patented Apr. 20, 1937

2,077,546

UNITED STATES PATENT OFFICE 2,077,546

PROCESS FOR DYEING LEATHER

John Burchill and George Stuart James White, Blackley, Manchester, England, assignors to Imperial Chemical Industries Limited, a corporation of Great Britain No Drawing. Application October 30, 1935, Serial No. 47,471. In Great Britain December 4, 1934

8 Claims. (Cl. 8—5)

A. This invention relates to the dyeing of leather. The dyeing of leather is attended by difficulties: Many leathers are incapable of withstanding the temperatures necessary to obtain a thorough impregnation with dyestuffs, particularly those dyestuffs of the chrome and afterchrome class. It is known that, when such dyestuffs are applied to wool, treatment and fixation at or near the boil is necessary to produce a correct shade and maximum fastness. Leathers, however, cannot withstand such temperatures for the period of time required to attain such color and fastness. Consequently, the use of chrome and afterchrome dyes on leather has not been attended with success. It is our surprising discovery that dyeings of good color and excellent fastness are obtained on leather by chrome dyestuffs when applied according to this invention.

B. It is an object of this invention to dye leather. It is another object of the invention to dye leather fast colors of good shade, at temperatures which do not deleteriously affect the leather. Other objects of the invention are in part apparent and in part more fully hereinafter described.

C. The objects of this invention are accomplished, generally speaking, by dyeing leather with chrome dyestuffs in the presence of alkali-metal dichromates, at temperatures of the order of 55° to 65° C. By the term "chrome dyestuffs" we indicate that class of azo dyes which are applied to materials by a chrome or afterchrome process.

D. In the practice of our invention chrome dyes are generally useful, including both chromate and afterchrome dyestuffs, but it is to be understood that from this class those dyes are least useful which tend to precipitate from their dilute solutions at dyeing temperatures in the presence of alkali-metal dichromates. Among the dyestuffs which illustrate this class of dyes there are the following:

Solochrome Yellow Y (C. I. No. 197)
Solochrome Brown RH (C. I. No. 96)
Solochrome Red B (C. I. No. 216)
Solochrome Violet R (C. I. No. 169)
Solochrome Black WD (C. I. No. 203)
Solochrome Black 6B (C. I. No. 201)
Solochrome Black A (C. I. No. 204)
Solochrome Black F (C. I. No. 299)
Solochrome Black PV (C. I. No. 170)
Solochrome Yellow 2GS (sulfanilic acid→salicylic acid)
Solochrome Brown RS (sulfanilic acid→alpha-naphthylamine→salicylic acid)
Solochrome Brown RGS (metanilic acid→alpha-naphthylamine→salicylic acid)
Solochrome Brown EBS (4-nitro 2-amino phenol→m-phenylene diamine←Laurents acid)
Solochrome Brown PS (naphthenic acid→resorcinol←4-chloro-2-amino phenol)
Solochrome Orange GRS (C. I. Supplement, p. 52)
Solochrome Red ERS (C. I. No. 652)
Solochrome Dark Blue BS (C. I. No. 202)
Alizarine Red AS (C. I. No. 1034)

It will be understood that this list is exemplary and not limitative.

E. In a preferred method of carrying the invention into effect, a hot aqueous solution of the requisite quantity of dyestuff is mixed with a hot solution of half its weight of alkali-metal dichromate, leather is wetted down, neutralized if necessary, drummed in four or five times its weight of water, and subjected to the action of the dye mixture. After impregnation has occurred, a sufficient quantity of an exhausting agent, usually approximately an equal weight of the agent suitably diluted, is added to the contents of the drum, and dyeing is continued. During this treatment the temperature of the bath should usually not fall below 55° C., although a somewhat lower temperature may be used with certain dyestuffs, and should not usually be raised above 65° C., although in some cases, e. g. in that of a fully chrome tanned leather which will stand a boiling temperature for a short period, this limit may be exceeded. In general, however, it is not technically desirable to go beyond the range specified.

F. The following examples illustrate but do not limit the invention. The parts are by weight.

Example I 100 parts dry weight of sumac-mordanted, chrome-tanned gloving sheep leather were thoroughly wetted in water, and were drummed in 500 parts of water at 60° C. To the contents of the drum were added a mixture of a solution of 5 parts of C. I. No. 203, dissolved in ten times its weight of hot water, and two and one-half parts of potassium dichromate dissolved in 20 parts of hot water. The leather was drummed in this mixture for thirty minutes, 5 parts of formic acid (Commercial 86%) diluted with 50 parts of water were added to the contents of the drum, and drumming was continued for twenty minutes more. The leather was dyed a level, well-penetrated pearl grey shade having very good fastness to washing with soap. The leather was freed from excess dichromate by drumming it for a short time in a solution of a suitable reducing agent, such as sodium thiosulfate or sodium sulfite.

*Example II*

100 parts of dry semi-chrome Persian lamb are wetted down in water and then entered into a drum along with 350 parts of water at 60° C. To the contents of the drum is added a mixture of 5 parts of C. I. No. 96, and 2½ parts potassium dichromate dissolved in 20 parts of hot water and mixed. Drumming is continued for thirty minutes when 5 parts of formic acid diluted with 50 parts of water is added to the contents of the drum and drumming continued for a further twenty minutes. The leather will then be found to be dyed to a brown shade of very good fastness to washing and light. It may be freed from excess dichrome as described in Example I.

*Example III*

100 parts dry weight of aldehyde tanned sheepskin splits were washed free from filling material and dyed in 1000 parts of water at 55–60° C. with 100 parts of C. I. No. 299 dissolved in hot water to which was added 5 parts of potassium dichromate also in aqueous solution. The mixed dyestuff and dichromate solutions were added to the leather in the drum and dyeing was continued for thirty minutes. 10 parts of formic acid suitably diluted were run into the drum, and after a further twenty minutes of drumming the leather was rinsed, fat liquored, and dried. It was freed from excess dichromate as described hereinabove. A black shade of very good washing fastness was produced.

Leather dyed by this process is colored shades of very good fastness to washing which are unattainable by the use of acid and direct dyestuffs not containing a metal in the dyestuff complex.

G. It is to be noted that the dyestuffs above mentioned when applied to wool are finally developed and fixed by treatment at or near the boil in order to produce the correct shade and maximum fastness. It is surprising that dyeings on leather of such excellent properties can be obtained by means of the same dyestuffs without resort to boiling because the application of the dyestuffs at approximately boiling temperature has, prior to our process, been considered indispensable to their efficient fixation and development. Leather dyed with these colors is dyed level, is well-penetrated, and in excellent shades.

H. The process is exceptionally suitable for the dyeing of gloving leathers, but may be used on all classes of leather except those rare and extremely fragile leathers which will not withstand even a temperature of 55° C.

I. As many apparently widely different embodiments of this invention may be made without departing from the spirit and scope thereof, it is to be understood that we do not limit ourselves to the specific embodiments thereof except as defined in the appended claims.

We claim:

1. The method of dyeing which comprises wetting tanned leather, impregnating it with a solution containing an alkali-metal dichromate and a synthetic dyestuff of the class consisting of chrome and afterchrome dyes, the temperature being maintained throughout the process below a temperature of about 65° C.

2. The method of dyeing which comprises wetting tanned leather, drumming it in a solution containing an alkali-metal dichromate and a synthetic dyestuff of the class consisting of chrome and afterchrome dyes, adding to the dye bath an exhausting agent, and maintaining the temperature throughout the process at 55° to 65° C.

3. The method of dyeing which comprises impregnating tanned leather with water, drumming it for about one-half hour in a solution containing an alkali-metal dichromate and a synthetic dyestuff consisting of chrome and afterchrome dyes, adding to the dye bath an exhausting agent, and removing excess dichromate by treatment with a reducing agent, the temperature throughout the process being maintained at about 55° to 65° C.

4. The method of dyeing which comprises wetting leather and drumming it in water, drumming it in a solution containing the dye identified in the Color Index as No. 203 and an alkali-metal dichromate for about one-half hour and adding to the dye bath an exhausting agent, the temperature being maintained throughout the process at about 60° C.

5. The method of dyeing which comprises wetting about 100 parts sumac mordanted chrome tanned leather, drumming it in 500 parts of water at 60° C., adding to the drum the mixture of a solution containing about 5 parts of the dye identified in the Color Index as No. 203 in about 10 parts of hot water and a solution containing about 2½ parts potassium dichromate in about 20 parts hot water, drumming for about 30 minutes, adding about 5 parts of formic acid in 50 parts water, drumming for about 20 minutes, maintaining the temperature at about 55° to 65° C. throughout the foregoing process, and removing excess dichromate by a reducing agent.

6. The method which comprises dyeing tanned leather with one of a group of compounds consisting of a synthetic chrome and a synthetic afterchrome dye in the presence of an alkali-metal dichromate at a temperature below about 65° C.

7. The method which comprises dyeing tanned leather with a dye identified in the Color Index as No. 299 in the presence of an alkali-metal dichromate at a temperature below about 65° C.

8. The method which comprises dyeing tanned leather with a dye identified in the Color Index as No. 96 in the presence of an alkali-metal dichromate at a temperature below about 65° C.

JOHN BURCHILL.
GEORGE STUART JAMES WHITE.